(12) United States Patent
Ishii et al.

(10) Patent No.: US 10,123,628 B2
(45) Date of Patent: Nov. 13, 2018

(54) BLOWER UNIT

(71) Applicants: DENSO CORPORATION, Kariya, Aichi-pref. (JP); SOKEN, INC., Nishio, Aichi-pref. (JP)

(72) Inventors: Fumiya Ishii, Kariya (JP); Masanori Yasuda, Nishio (JP); Shuzo Oda, Kariya (JP)

(73) Assignees: DENSO CORPORATION, Kariya, Aichi-pref. (JP); SOKEN, INC., Nisshin, Aichi-pref. (JP)

( * ) Notice: Subject to any disclaimer, the term of this patent is extended or adjusted under 35 U.S.C. 154(b) by 0 days.

(21) Appl. No.: 15/547,586

(22) PCT Filed: Jan. 7, 2016

(86) PCT No.: PCT/JP2016/050391
§ 371 (c)(1),
(2) Date: Jul. 31, 2017

(87) PCT Pub. No.: WO2016/132757
PCT Pub. Date: Aug. 25, 2016

(65) Prior Publication Data
US 2018/0020838 A1    Jan. 25, 2018

(30) Foreign Application Priority Data

Feb. 16, 2015 (JP) .................. 2015-027739
Jul. 1, 2015 (JP) .................. 2015-132650

(51) Int. Cl.
*A47C 7/74* (2006.01)
*B60H 1/12* (2006.01)
(Continued)

(52) U.S. Cl.
CPC .............. *A47C 7/744* (2013.01); *B60H 1/12* (2013.01); *B60H 1/3211* (2013.01);
(Continued)

(58) Field of Classification Search
CPC ........ A47C 7/744; B60H 1/12; B60H 1/3211; B60N 2/5657; B60N 2/5692; F04D 29/444; F04D 29/167
(Continued)

(56) References Cited

U.S. PATENT DOCUMENTS 5,296,769 A * 3/1994 Havens .................. A47L 5/22
310/58
6,929,322 B2 * 8/2005 Aoki .................. B60H 1/00285
297/180.13
(Continued)

FOREIGN PATENT DOCUMENTS

JP      S64060799 A    3/1989
JP      H04347398 A    12/1992
(Continued)

*Primary Examiner* — Rodney B White
(74) *Attorney, Agent, or Firm* — Harness, Dickey & Pierce, P.L.C.

(57) ABSTRACT

An air passage forming member includes an air passage inner wall surface that forms a wall surface of a connecting air passage connected to a cushion air passage. A blower device case has an air intake opening that is connected to the connecting air passage. A centrifugal fan is received in the inside of the blower device case. The air passage forming member is arranged such that at a downstream end of the connecting air passage, the air, which flows along the air passage inner wall surface in the connecting air passage, forms an air flow, which is directed in an axial direction of a fan central axis, or an air flow, which is directed toward an outer side in a radial direction of the fan central axis in comparison to the air flow that is directed in the axial direction.

11 Claims, 12 Drawing Sheets

(51) Int. Cl.
  *B60H 1/32* (2006.01)
  *B60N 2/56* (2006.01)
  *F04D 29/16* (2006.01)
  *F04D 29/44* (2006.01)

(52) U.S. Cl.
  CPC ......... *B60N 2/5657* (2013.01); *B60N 2/5692* (2013.01); *F04D 29/167* (2013.01); *F04D 29/444* (2013.01)

(58) Field of Classification Search
  USPC ........................................ 297/180.13, 180.14
  See application file for complete search history.

(56) References Cited

U.S. PATENT DOCUMENTS

| | | | | |
|---|---|---|---|---|
| 7,028,493 | B2* | 4/2006 | Tomita | B60H 1/00285 |
| | | | | 297/180.14 |
| 2003/0102699 | A1* | 6/2003 | Aoki | B60H 1/00285 |
| | | | | 297/180.14 |
| 2005/0226721 | A1 | 10/2005 | Higashida | |
| 2006/0138812 | A1 | 6/2006 | Aoki | |
| 2008/0019827 | A1* | 1/2008 | Hirata | F04D 29/4226 |
| | | | | 415/206 |
| 2008/0095629 | A1 | 4/2008 | Eguchi et al. | |
| 2009/0152909 | A1 | 6/2009 | Andersson | |
| 2012/0080911 | A1 | 4/2012 | Brykalski et al. | |
| 2015/0084384 | A1* | 3/2015 | Ise | B60N 2/5635 |
| | | | | 297/180.14 |
| 2015/0274047 | A1* | 10/2015 | Ise | B60N 2/5635 |
| | | | | 297/180.14 |
| 2017/0284413 | A1* | 10/2017 | Kim | F04D 17/162 |

FOREIGN PATENT DOCUMENTS

| | | |
|---|---|---|
| JP | H07224795 A | 8/1995 |
| JP | H10331795 A | 12/1998 |
| JP | 2004190535 A | 7/2004 |
| JP | 2004360670 A | 12/2004 |
| JP | 2006176059 A | 7/2006 |
| JP | 2008101537 A | 5/2008 |
| JP | 2008232020 A | 10/2008 |
| JP | 2010053815 A | 3/2010 |
| JP | 2010133297 A | 6/2010 |

* cited by examiner

BLOWER UNIT

CROSS REFERENCE TO RELATED APPLICATIONS

This application is a U.S. National Phase Application under 35 U.S.C. 371 of International Application No. PCT/JP2016/050391 filed on Jan. 7, 2016 and published in Japanese as WO 2016/132757 A1 on Aug. 25, 2016. This application is based on and claims the benefit of priority from Japanese Patent Application No. 2015-27739 filed on Feb. 16, 2015 and Japanese Patent Application No. 2015-132650 filed on Jul. 1, 2015. The entire disclosures of all of the above applications are incorporated herein by reference.

TECHNICAL FIELD

The present disclosure relates to a blower unit that blows air to an air passage formed in a cushion member of a vehicle seat.

BACKGROUND ART

A vehicle seat air conditioning device recited in, for example, the patent literature 1 is known as a device that includes this type of blower unit. The vehicle seat air conditioning device, which is recited in the patent literature 1, is a device that limits conduction of vibrations through particularly a vibration-proof structure. The vehicle seat air conditioning device of the patent literature 1 is a blow type vehicle seat air conditioning device that blows the air through a seat surface. Therefore, an air intake opening of a blower device of the vehicle seat air conditioning device opens at an inside of a vehicle cabin or an inside of the vehicle seat. Furthermore, a casing of the blower device has a bell mouth installed around the air intake opening. Because of the provision of the bell mouth, the blower device can effectively draw the air into each gap defined between corresponding adjacent two of blades that are rotated in an inside of the blower device.

CITATION LIST

Patent Literature

PATENT LITERATURE 1: JP2006-176059A

SUMMARY OF INVENTION

Although the vehicle seat air conditioning device of the patent literature 1 is of the air blowing type, development of an air drawing type as a type of an air ventilation method is in progress besides the increasing of the air flow rate. Furthermore, because of a need for thinning the vehicle seat, flattening of the blower device is in progress.

The bell mouth, which is bulged in an axial direction of the fan at the casing of the blower device, is a factor that causes an increase in the axial thickness of the blower device. Therefore, it is conceivable to eliminate the bell mouth to reduce the axial thickness of the blower device. However, when the bell mouth is simply eliminated, the function of the bell mouth for guiding the air to be drawn into the air intake opening of the blower device is lost. Thereby, the air flow, which flows into each gap between the corresponding adjacent two of the blades of the blower device, becomes turbulent. Thus, the noise of the blower device is worsened. The above finding is made through extensive study of the inventors of the present application.

The present disclosure is made in view of the above point, and it is an objective of the present disclosure to provide a blower unit that can implement flattening of a blower device while limiting worsening of the noise of the blower device.

In order to achieve the above objective, according to one aspect of the present disclosure, a blower unit includes:

an air passage forming member, in which a connecting air passage is formed, wherein the connecting air passage is connected to a cushion air passage that is formed in a cushion member of a vehicle seat, and the air passage forming member has an air passage inner wall surface that forms a wall surface of the connecting air passage; and a blower device that includes:
  a blower device case, in which an air intake opening is formed, wherein the air intake opening is connected to an opposite side of the connecting air passage, which is opposite from the cushion air passage; and
  a centrifugal fan that is received in the blower device case and draws air, which is present in the cushion air passage, through the connecting air passage and the air intake opening in this order when the centrifugal fan is rotated about a fan central axis, wherein:

the air passage forming member is arranged such that at a downstream end of the connecting air passage along the air flow, the air, which flows along the air passage inner wall surface in the connecting air passage, forms an air flow, which is directed in an axial direction of the fan central axis, or an air flow, which is directed toward an outer side in a radial direction of the fan central axis in comparison to the air flow that is directed in the axial direction.

The air passage forming member is arranged such that at the downstream end of the connecting air passage along the air flow, the air, which flows along the air passage inner wall surface, forms the air flow, which is directed in the axial direction of the fan central axis, or the air flow, which is directed toward the outer side in the radial direction of the fan central axis in comparison to the air flow that is directed in the axial direction. Therefore, the air can be drawn into the air intake opening of the blower device by guiding the air along the air passage inner wall surface in a manner that limits generation of turbulence in the air flow, which is introduced into each gap between corresponding adjacent two of the blades of the blower device, without providing a portion that corresponds to the bell mouth in the air blower case. Therefore, without requiring the bell mouth, it is possible to limit the worsening of the noise at the blower device, and it is possible to flatten the blower device.

DESCRIPTION OF EMBODIMENTS

Hereinafter embodiments of the present disclosure will be described. In the following respective embodiments, the portions, which are identical to each other or are equivalent to each other, will be indicated by the same reference signs.

First Embodiment

Figure 1:
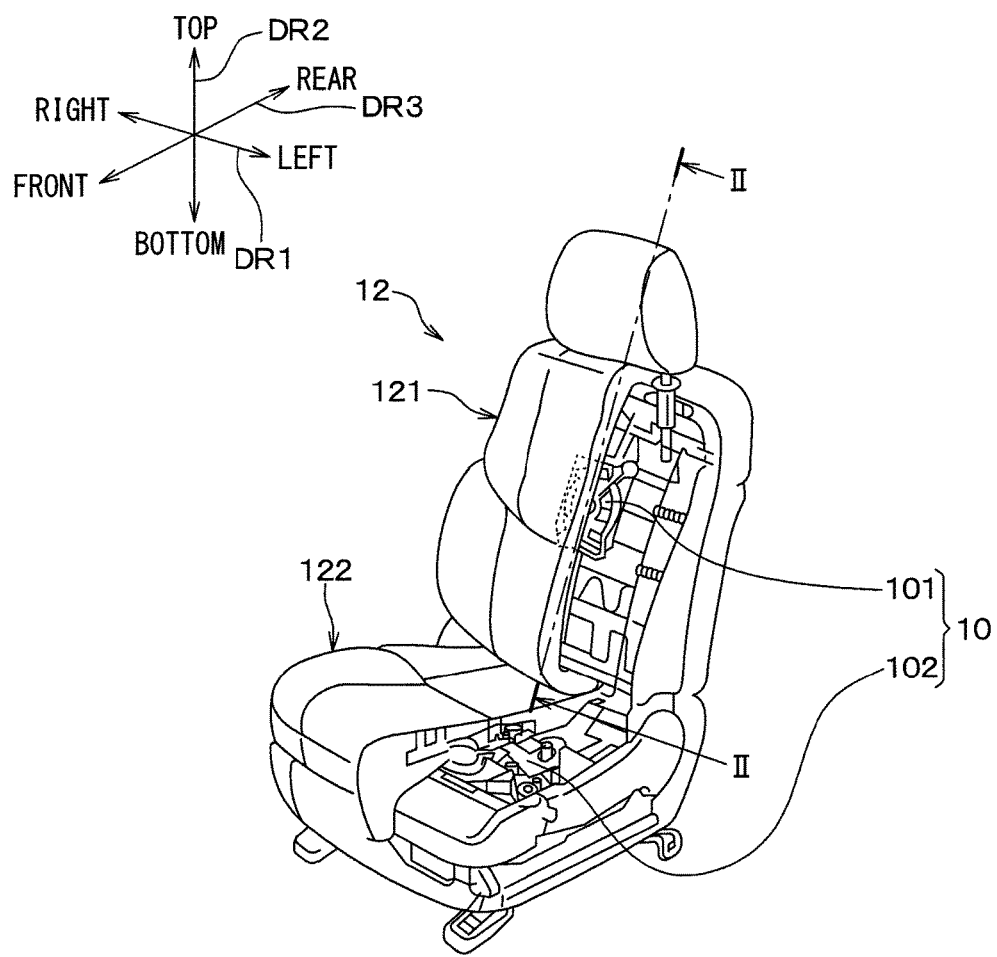
FIG. 1 is a perspective view showing a vehicle seat air conditioning device and a vehicle seat, which is ventilated with the vehicle seat air conditioning device, according to a first embodiment.

FIG. 1 is a perspective view showing a vehicle seat air conditioning device 10 and a vehicle seat 12, which is ventilated with the vehicle seat air conditioning device 10, according to a first embodiment. In FIG. 1, an arrow DR1 indicates a left-to-right direction DR1 of a vehicle, i.e., a vehicle widthwise direction DR1, and an arrow DR2 indicates a top-to-bottom direction DR2 of the vehicle, i.e., a vehicle top-to-bottom direction DR2, and an arrow DR3 indicates a front-to-rear direction DR3 of the vehicle, i.e., a vehicle front-to-rear direction DR3. Furthermore, FIG. 1 indicates a partial cross sectional view of the vehicle seat 12.

The vehicle seat 12 of FIG. 1 is a front seat that is placed on a vehicle front side of a rear seat (not shown). The vehicle seat 12 is a ventilation subject seat that is ventilated with the vehicle seat air conditioning device 10, which is a seat ventilation system. As shown in FIG. 1, the vehicle seat 12 includes a seat backrest 121 and a seat bottom 122. The seat backrest 121 serves as a backrest for a vehicle occupant (i.e., a seat occupant) who is seating on the vehicle seat 12. The seat bottom 122 supports buttocks and femurs of the occupant. The vehicle seat 12 is shaped to be symmetrical in the vehicle widthwise direction DR1.

The vehicle seat air conditioning device 10 is a seat air conditioning device of an air drawing type that draws the air through a seat surface. The vehicle seat air conditioning device 10 includes a first blower unit 101 and a second blower unit 102. The first blower unit 101 is installed in the seat backrest 121 to blow the air through the seat backrest 121. The second blower unit 102 is installed to the seat bottom 122 to blow the air through the seat bottom 122.

Figure 2:
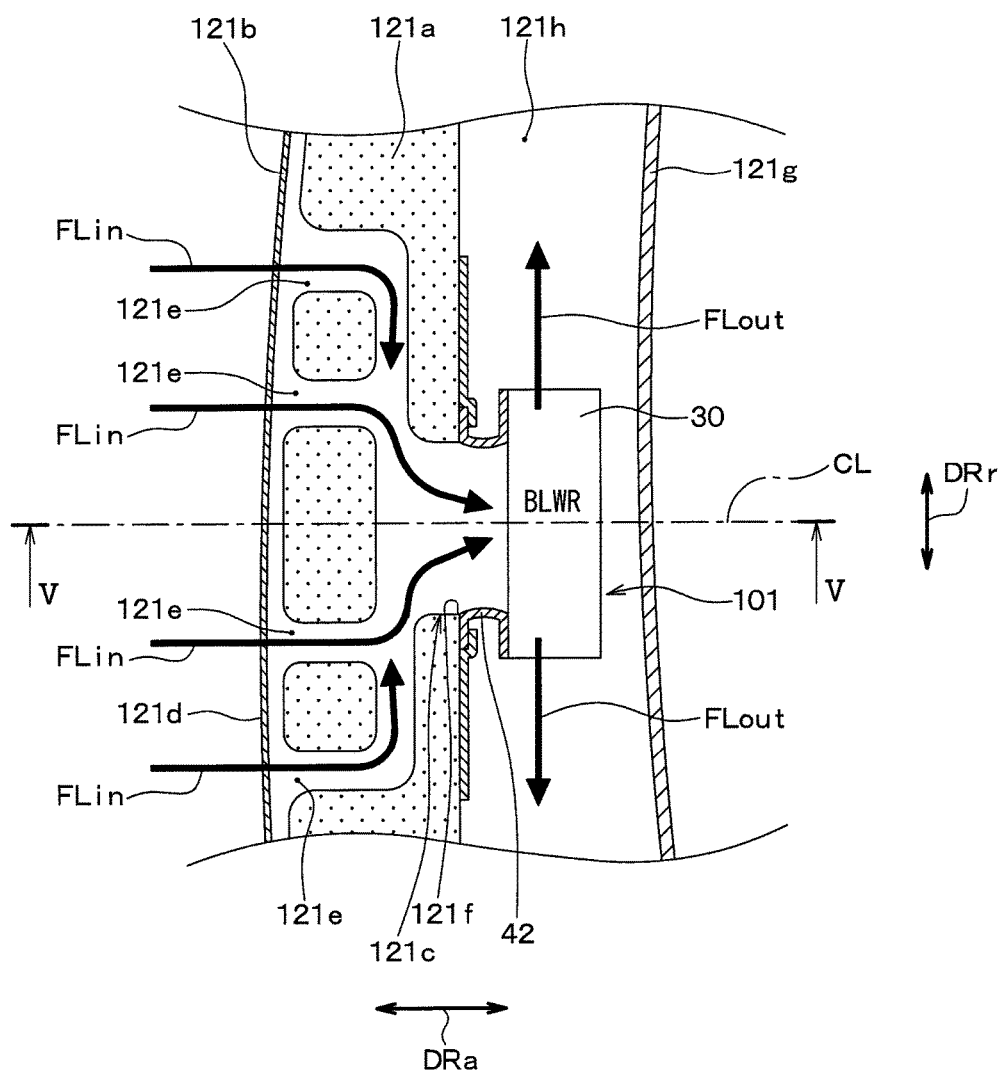
FIG. 2 is a cross sectional view taken along line II-II in FIG. 1.

As shown in FIG. 2, the seat backrest 121 of the vehicle seat 12 includes a cushion member 121a, an upholstery cover 121b and a back surface cover 121g. The cushion member 121a is made of urethane foam, which has resiliency. The upholstery cover 121b is installed to cover a surface of the cushion member 121a on the occupant side. FIG. 2 is a cross sectional view taken along line II-II in FIG. 1.

The upholstery cover 121b of the seat backrest 121 is a cover that is breathable. For example, the upholstery cover 121b is formed by a perforated upholstery, which is a natural leather or a synthetic leather having small holes that penetrate therethrough, or an upholstery made of a cloth.

A cushion air passage 121c, which is branched in an inside of the cushion member 121a, is formed in the cushion member 121a. Since the cushion air passage 121c is branched into a plurality of passages, the cushion member 121a has a plurality of cushion ventilation holes 121e. The cushion ventilation holes 121e are upstream ends of the cushion air passage 121c that are opened at the upholstery cover 121b side of the cushion member 121a. In this way, air intake portions, through which the air is drawn into the cushion member 121a side, are formed in a wide range in a cover surface 121d of the upholstery cover 121b, which serves as a seat surface that is contactable with the occupant.

Furthermore, the cushion air passage 121c includes an opening end 121f. The opening end 121f is a downstream end of the cushion air passage 121c that is opened at an opposite side of the cushion member 121a, which is opposite from the upholstery cover 121b in a thickness direction of the cushion member 121a. That is, in the cushion member 121a, the cushion ventilation holes 121e extend in parallel and are communicated with the opening end 121f of the cushion air passage 121c.

The back surface cover 121g of the seat backrest 121 covers a side of the seat backrest 121, which is opposite from the upholstery cover 121b in a thickness direction of the seat backrest 121. The back surface cover 121g is placed such that a cushion back side space 121h is formed between the back surface cover 121g and the cushion member 121a. The first blower unit 101 is installed in the cushion back side space 121h.

The first blower unit 101 is installed to the cushion member 121a such that the first blower unit 101 is not movable relative to the cushion member 121a. The first blower unit 101 includes a centrifugal blower device 30 and an air passage forming member 42. The air passage forming member 42 communicates between the cushion air passage 121c and the blower device 30.

Figure 3:
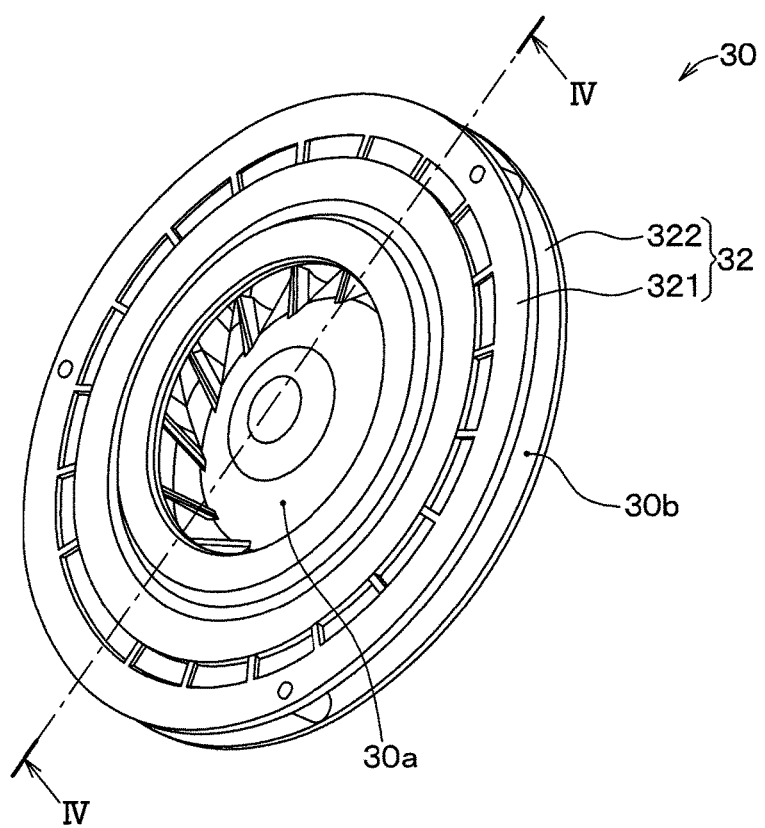
FIG. 3 is a perspective view showing an exterior of only a blower device shown in FIG. 2.
Figure 4:
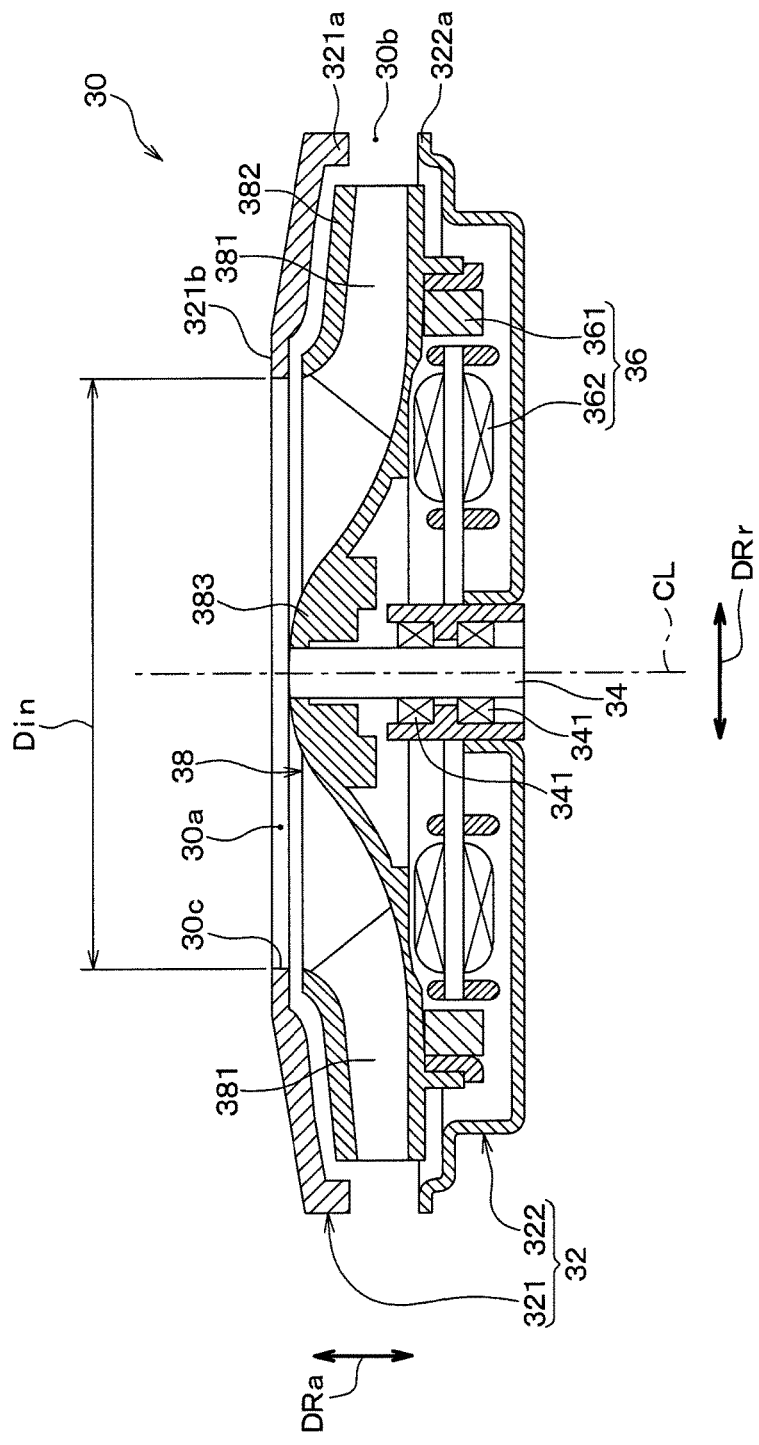
FIG. 4 is a cross sectional view taken along line IV-IV in FIG. 3.

As shown in FIG. 3, the blower device 30 is shaped into a flat circular disk form. FIG. 3 is a perspective view showing an exterior of only the blower device 30. FIG. 4 is a cross sectional view taken along line IV-IV in FIG. 3, i.e., a view of an axial cross section of the blower device 30, which is cut along a plane that includes a fan central axis CL.

An arrow Dra of FIG. 4 indicates an axial direction of the fan central axis CL, i.e., a fan axial direction DRa.

As shown in FIGS. 3 and 4, the blower device 30 is a centrifugal blower device of a round discharge type. More specifically, the blower device 30 is a turbo fan that has swept-back blades. The blower device 30 includes a blower device case 32, a rotatable shaft 34, an electric motor 36 and a centrifugal fan 38. The blower device case 32 is a housing of the blower device 30.

The blower device case 32 receives the electric motor 36 and the centrifugal fan 38. The blower device case 32 includes a first case member 321 and a second case member 322. The blower device case 32 protects the electric motor 36 and the centrifugal fan 38 from external dust and fouling agent.

The first case member 321 forms a portion of the blower device case 32, which is located on the cushion member 121a side in the fan axial direction DRa, i.e., one side portion of the blower device case 32. The second case member 322 forms the other side of the blower device case 32. The cushion member 121a is shown in FIG. 2.

As shown in FIGS. 3 and 4, the first case member 321 and the second case member 322 are fixed together with screws and are thereby integrated together. For example, one of the first case member 321 and the second case member 322 includes a plurality of tubular support shafts, which project toward the other one of the first case member 321 and the second case member 322 and are arranged one after another along a peripheral edge portion of the one of the first case member 321 and the second case member 322. The first case member 321 and the second case member 322 are fixed together with the screws that are respectively inserted into the tubular support shafts.

An air intake opening 30a, through which the air is drawn into the blower device 30, is formed in the first case member 321. The air intake opening 30a is shaped into a circle, and a center of the air intake opening 30a coincides with the fan central axis CL. However, a bell mouth, which is normally installed around an air intake opening in a centrifugal blower device, is not installed in the blower device 30 of the present embodiment. That is, a bulge, which is bulged toward a case outer side in the fan axial direction DRa, is not formed around the air intake opening 30a of the first case member 321. That is, the air intake opening 30a is formed at an outer surface 321b of the blower device case 32, which faces the cushion air passage 121c side in the fan axial direction DRa, and the outer surface 321b of the blower device case 32, at which the air intake opening 30a is formed, forms a smooth surface.

Furthermore, a peripheral edge portion 321a of the first case member 321 and a peripheral edge portion 322a of the second case member 322 are spaced from each other in the fan axial direction DRa, and a discharge outlet 30b, through which the air is discharged from the blower device 30, is formed between the peripheral edge portion 321a and the peripheral edge portion 322a. The discharge outlet 30b of the blower device 30 is formed to extend all around the blower device case 32 about the fan central axis CL. Thus, the blower device 30 discharges the air along an entire circumferential extent of the blower device case 32 about the fan central axis CL.

As shown in FIG. 4, the rotatable shaft 34 is a cylindrical rod material and is supported by the second case member 322 through a bearing 341. Therefore, the rotatable shaft 34 is rotatable about the fan central axis CL relative to the second case member 322. Furthermore, the rotatable shaft 34 projects into an inside of the blower device case 32, and a main plate 383 of the centrifugal fan 38 is joined to this projecting portion of the rotatable shaft 34 in a non-rotatable manner relative to the rotatable shaft 34. Thereby, the rotatable shaft 34 is rotated about the fan central axis CL together with the centrifugal fan 38.

The electric motor 36 is an outer rotor brushless DC motor and is placed between the main plate 383 of the centrifugal fan 38 and the second case member 322 in the fan axial direction DRa. The second case member 322 also functions as a motor housing of the electric motor 36.

When the electric motor 36 is energized, the electric motor 36 rotates the centrifugal fan 38 about the fan central axis CL. The electric motor 36 includes a motor rotor 361 and a motor stator 362.

The motor rotor 361 has permanent magnets and is fixed to the main plate 383 of the centrifugal fan 38. The motor stator 362 has coils and is placed on a radially inner side of the motor rotor 361. The motor stator 362 is fixed to the second case member 322.

The centrifugal fan 38 is a centrifugal multiblade fan, i.e., an impeller of a centrifugal blower device. The centrifugal fan 38 includes a plurality of blades 381, a side plate 382 and the main plate 383. The blades 381 are arranged one after another about the fan central axis CL.

When the centrifugal fan 38 is rotated about the fan central axis CL, the air is drawn from the outside of the blower device 30 through the air intake opening 30a, and the drawn air is discharged to the outside of the blower device 30 through the discharge outlet 30b. In other words, when the centrifugal fan 38 is rotated, the blower device 30 draws the air into the inside of the blower device 30 through the air intake opening 30a and discharges the drawn air to the outside of the blower device 30 through the discharge outlet 30b. Furthermore, as shown in FIGS. 2 and 4, the air, which is discharged from the discharge outlet 30b of the blower device 30 to the cushion back side space 121h, which includes the space located at the outside of the blower device 30, flows to the outside of the vehicle seat 12 from the cushion back side space 121h at the vehicle cabin.

Figure 5:
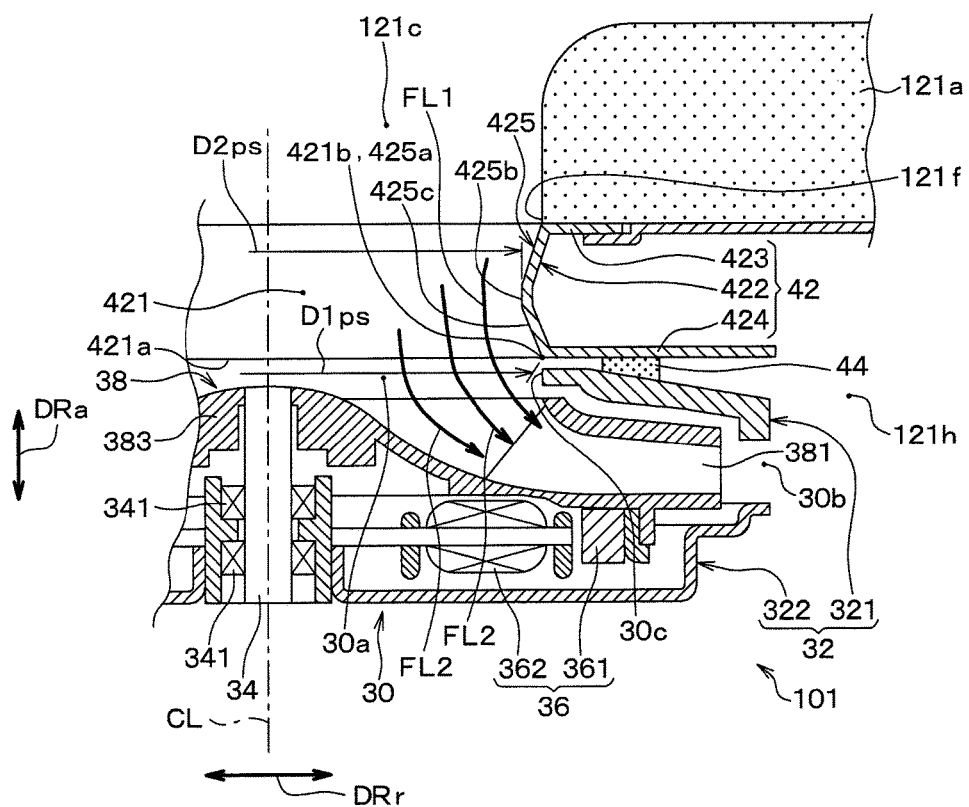
FIG. 5 is a cross sectional view taken along line V-V in FIG. 2.

As shown in FIG. 5, which is a cross sectional view taken along line V-V in FIG. 2, the air passage forming member 42 is interposed between the cushion member 121a and the blower device 30 in the fan axial direction DRa and is clamped by, for example, the cushion member 121a and the blower device 30. The air passage forming member 42 includes a duct portion 422, a first flange portion 423 and a second flange portion 424. The duct portion 422 is shaped into a tubular form. The first flange portion 423 extends in a form of a flange from one end of the duct portion 422, which is located on the cushion member 121a side. The second flange portion 424 extends in a form of a flange from the other end of the duct portion 422, which is located on the blower device 30 side. The air passage forming member 42 is made of an elastic material, such as rubber. The duct portion 422, the first flange portion 423 and the second flange portion 424 of the air passage forming member 42 are formed integrally as a one-piece body. A connecting air passage 421 is formed in an inside of the duct portion 422.

The first flange portion 423 is urged against the cushion member 121a in the fan axial direction DRa. The second flange portion 424 is urged against the first case member 321 of the blower device 30 in the fan axial direction DRa through a packing material 44 that is shaped into a circular ring form about the fan central axis CL and is made of, for example, urethane foam.

In this way, one end of the connecting air passage 421 is connected to the opening end 121f of the cushion air passage 121*c*, and the other end of the connecting air passage 421, which is located on the opposite side (i.e., the blower device 30 side) that is opposite from the cushion air passage 121*c*, is connected to the air intake opening 30*a* of the blower device 30. In other words, the air intake opening 30*a* of the blower device 30 is communicated with the cushion air passage 121*c* through the connecting air passage 421, and the air in the cushion air passage 121*c* is introduced to the air intake opening 30*a* of the blower device 30 through the air passage forming member 42. When the centrifugal fan 38 of the blower device 30 is rotated about the fan central axis CL, the air in the cushion air passage 121*c* is drawn by the centrifugal fan 38 through the connecting air passage 421 and the air intake opening 30*a* in this order.

The duct portion 422 of the air passage forming member 42 has an air passage inner wall surface 425 at the inside of the duct portion 422. The air passage inner wall surface 425 forms a wall surface of the connecting air passage 421. A passage cross section of the connecting air passage 421 is in a form of circle that is centered at the fan central axis CL. The passage cross section is a cross section that is perpendicular to the air flow direction in the connecting air passage 421.

The air passage inner wall surface 425 has a downstream end edge 425*a*, which is located at a downstream end of the connecting air passage 421, i.e., an end of the connecting air passage 421 on the blower device 30 side. The downstream end edge 425*a* continuously extends in a form of circle about the fan central axis CL. The downstream end edge 425*a* forms a downstream end 421*a* of the connecting air passage 421, which is a connecting end 421*a* of the connecting air passage 421 that is connected to the air intake opening 30*a* of the blower device 30. In other words, the downstream end edge 425*a* of the air passage inner wall surface 425 coincides with a peripheral edge 421*b* of the downstream end 421*a* of the connecting air passage 421. Furthermore, as shown in FIGS. 4 and 5, a passage downstream end opening diameter D1*ps*, which is a diameter of the downstream end 421*a* of the connecting air passage 421, coincides with an air intake opening diameter Din, which is a diameter of the air intake opening 30*a* of the blower device 30. For example, it is desirable that a relationship between the passage downstream end opening diameter D1*ps* and the air intake opening diameter Din is (D1*ps*−Din)/Din≤±0.05.

Also, as discussed above, a center location of the downstream end 421*a* of the connecting air passage 421 and a center location of the air intake opening 30*a* of the blower device 30 both coincide with the fan central axis CL. Thereby, it is understood that the connecting air passage 421 is arranged such that when the connecting air passage 421 is viewed in the fan axial direction DRa, the peripheral edge 421*b* of the downstream end 421*a* of the connecting air passage 421 and the peripheral edge 30*c* of the air intake opening 30*a* of the blower device 30 are aligned with each other.

The air passage inner wall surface 425 of the air passage forming member 42 has a narrowed portion 425*b* in the middle of the air passage inner wall surface 425 in the fan axial direction DRa. The narrowed portion 425*b* is a protruding surface, which is bulged toward an inner side in a radial direction DRr of the fan central axis CL, and the narrowed portion 425*b* narrows a middle portion of the connecting air passage 421, which is in the middle in the fan axial direction DRa.

A diameter D2*ps* of an apex of the narrowed portion 425*b* is a minimum diameter of the air passage inner wall surface 425, i.e., a minimum passage diameter of the connecting air passage 421, so that the diameter D2*ps* of the apex of the narrowed portion 425*b* is smaller than the passage downstream end diameter Dips of the connecting air passage 421. Therefore, the air passage inner wall surface 425 has a sloped surface 425*c*, which is formed at a downstream side in the air passage inner wall surface 425 along the air flow, more specifically, on the downstream side of the apex of the narrowed portion 425*b* along the air flow.

The sloped surface 425*c* forms the connecting air passage 421 such that the passage cross sectional area of the connecting air passage 421 is progressively increased toward the downstream end 421*a* of the connecting air passage 421. That is, the sloped surface 425*c* is formed such that the inner diameter of the air passage inner wall surface 425 is progressively increased toward the downstream side along the air passage inner wall surface 425. The sloped surface 425*c* is partially overlapped with the narrowed portion 425*b* and is placed in a range, which is from the apex of the narrowed portion 425*b* to the downstream end edge 425*a* in the fan axial direction DRa.

The air passage forming member 42 is formed in the above described manner. Therefore, the air, which flows in the connecting air passage 421 of the air passage forming member 42, flows from the connecting air passage 421 to the centrifugal fan 38 through the air intake opening 30*a* of the blower device 30, as indicated by arrows FL1, FL2. The arrows FL1, FL2 of FIG. 5 indicate the air flows FL1, FL2, which flow from the connecting air passage 421 to the centrifugal fan 38 through the air intake opening 30*a* of the blower device 30. Particularly, the arrow FL1 indicates the air flow FL1 that flows along the air passage inner wall surface 425.

That is, the air passage forming member 42 is arranged such that at the downstream end 421*a* of the connecting air passage 421, the air, which flows along the air passage inner wall surface 425 in the connecting air passage 421, forms the air flow (specifically the air flow FL1), which is further directed toward the outer side in the radial direction DRr of the fan central axis CL in comparison to the air flow that is directed in the fan axial direction DRa. In FIG. 5, the air flow FL1, which flows along the air passage inner wall surface 425, is directed obliquely relative to the fan central axis CL toward the outer side in the radial direction DRr at the downstream end 421*a* of the connecting air passage 421.

In the blower device 30 of the first blower unit 101, which is constructed in the above described manner, a change in a magnetic flux is generated at the core by the coil of the motor stator 362 that is energized by the external electric power source, so that an attractive force, which attracts the permanent magnets (or simply referred to as the magnets) fixed to the motor rotor 361, is generated. The motor rotor 361 is fixed to the rotatable shaft 34, which is supported by the centerpiece of the second case member 322 through the bearing 341, so that the motor rotor 361 is rotated about the fan central axis CL upon receiving the attractive force that attracts the permanent magnets. Furthermore, the centrifugal fan 38 is fixed to the motor rotor 361 and is rotated integrally with the rotatable shaft 34 and the motor rotor 361. Therefore, the multiple blades 381 of the centrifugal fan 38 provide a kinetic momentum to the air and expel the air from the outer peripheral portion of the centrifugal fan 38. The air, which is drawn from the air intake opening 30*a* of the blower device 30 and is expelled by the blades 381 of the centrifugal fan 38, is discharged to the outside through the discharge outlet 30*b* of the blower device 30.

That is, the blower device 30 generates the air flow, like the one indicated by an arrow FLin in FIG. 2 through the operation of the blower device 30. Specifically, the blower device 30 generates the air flow, which flows from the seat surface side in the order of the upholstery cover 121b, the cushion air passage 121c of the cushion member 121a and the connecting air passage 421 of the air passage forming member 42 through the operation of the blower device 30. At the same time, the blower device 30 discharges the air to the cushion back side space 121h, as indicated by the arrow FLout.

The structure of the first blower unit 101, which is provided to the seat backrest 121 of the vehicle seat 12 shown in FIG. 1, has been described above. The structure of the second blower unit 102, which is provided to the seat bottom 122, is similar to the structure of the first blower unit 101.

As described above, according to the present embodiment, as shown in FIG. 5, the air passage forming member 42 is arranged such that at the downstream end 421a of the connecting air passage 421, the air, which flows along the air passage inner wall surface 425 in the connecting air passage 421, forms the air flow (specifically the air flow FL1), which is further directed toward the outer side in the radial direction DRr of the fan central axis CL in comparison to the air flow that is directed in the fan axial direction DRa. Therefore, the air can be guided along the air passage inner wall surface 425 of the duct portion 422 and can be drawn into the air intake opening 30a of the blower device 30 in a manner that limits generation of the turbulence in the air flow, which is flown into each corresponding gap defined between corresponding adjacent two of the blades 381 of the centrifugal fan 38, without providing the bell mouth, which projects in the fan axial direction DRa around the air intake opening 30a of the blower device 30, at the blower device case 32. As a result, worsening of the noise of the blower device 30 can be limited without requiring the bell mouth, and the blower device 30 can be flattened.

Figure 6:
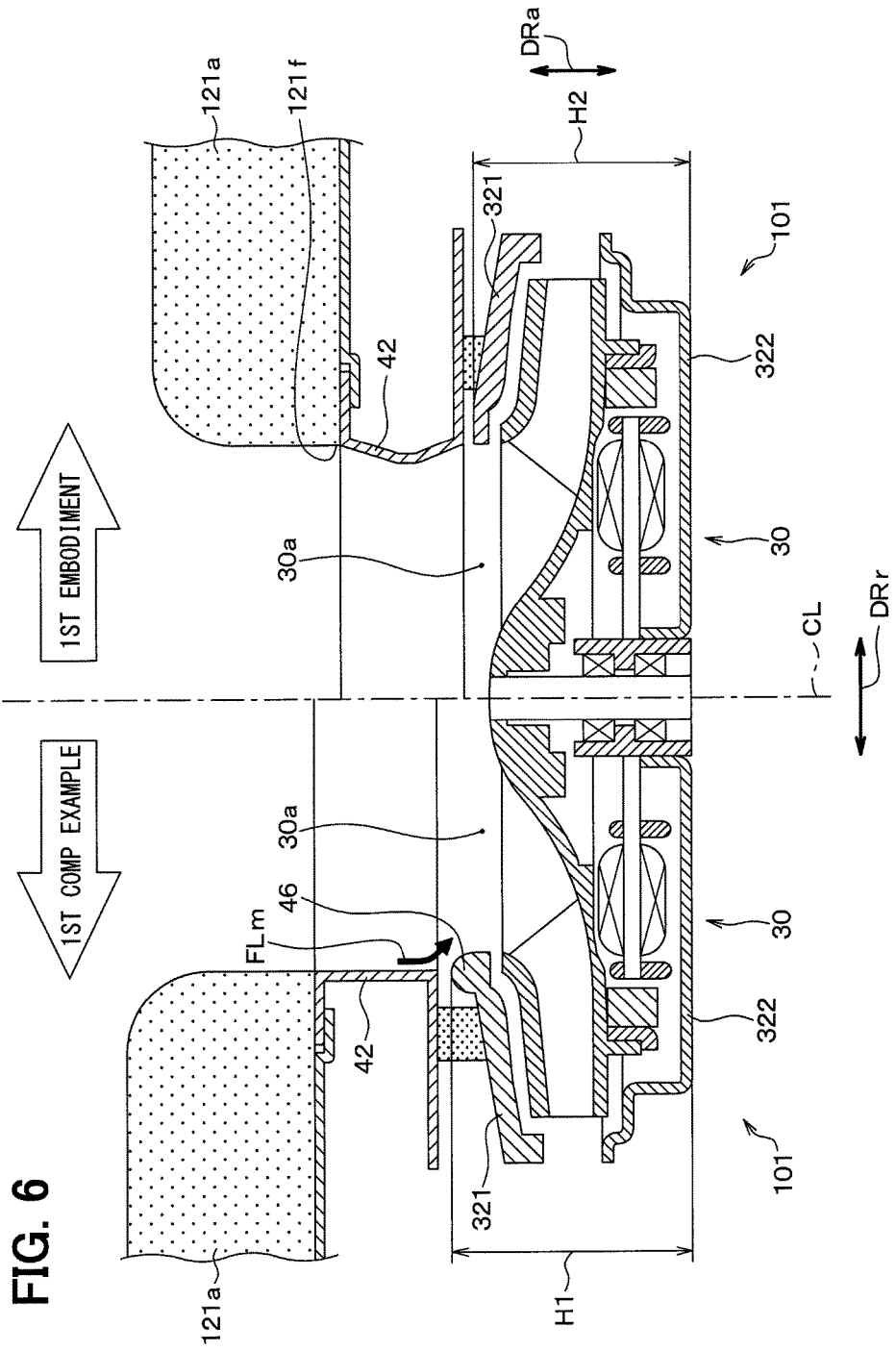
FIG. 6 is a cross sectional view of a first blower unit, which corresponds to FIG. 5, while a right side of a fan central axis shows the first blower unit of the first embodiment, and a left side of the fan central axis shows a first blower unit of a first comparative example that is contrasted with the first embodiment.

Here, an advantage of the flattening of the blower device 30 will be specifically described with reference to FIG. 6. FIG. 6 is a cross sectional view of the first blower unit 101, which corresponds to FIG. 5, while a right side of the fan central axis CL shows the first blower unit 101 of the present embodiment, and a left side of the fan central axis CL shows a first blower unit 101 of a first comparative example that is contrasted with the first embodiment. As shown in FIG. 6, a bell mouth 46 is provided to the first case member 321 of the blower device 30 of the first blower unit 101 in the first comparative example. However, the bell mouth 46 is not provided to the blower device 30 of the present embodiment.

As shown in FIG. 6, since the blower device 30 of the present embodiment does not have the bell mouth 46, a thickness H2 of the blower device 30 of the present embodiment, which is measured in the fan axial direction DRa, is smaller than a thickness H1 of the blower device 30 of the first comparative example, which is measured in the fan axial direction DRa. That is, by eliminating the bell mouth 46, the flattening of the blower device 30 in the fan axial direction DRa is implemented in the present embodiment in comparison to the first comparative example. Therefore, a total thickness of the first blower unit 101 of the present embodiment, i.e., a total thickness, which includes a thickness of the blower device 30 and a thickness of the air passage forming member 42, is reduced in comparison to a total thickness of the first blower unit 101 of the first comparative example. For example, in the cross section of FIG. 6, an outer shape of the bell mouth 46 of the first comparative example forms an arcuate shape that has a radius of about 2.5 mm, while in the present embodiment, the thickness of the blower device 30 is more flattened by about 10% (=1−H2/H1) in comparison to the first comparative example.

Figure 7:
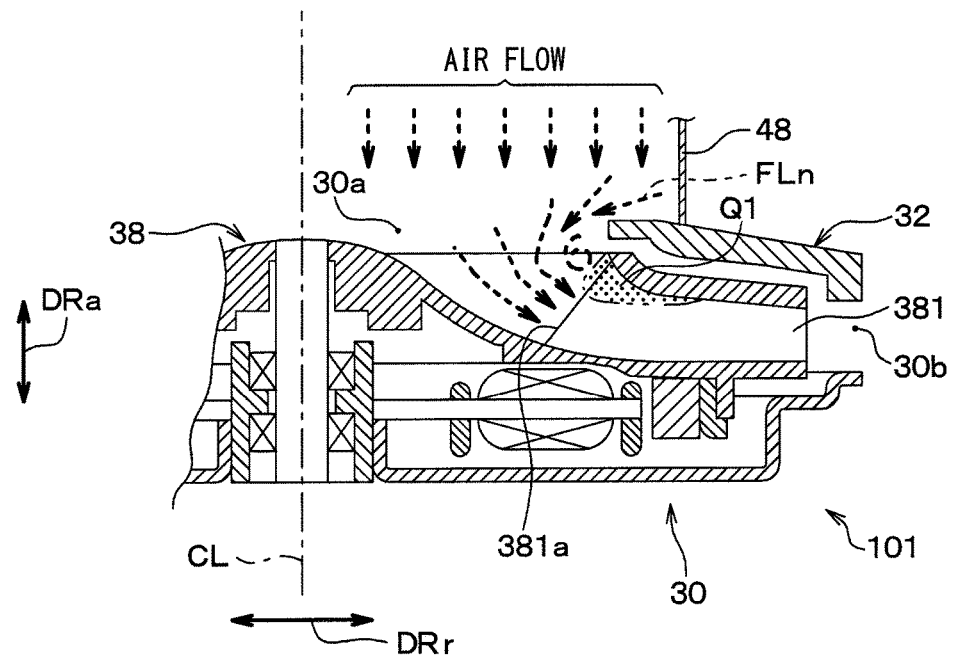
FIG. 7 is a cross sectional view of a first blower unit of a second comparative example that is contrasted with the first embodiment, corresponding of FIG. 5 of the first embodiment.
Figure 8:
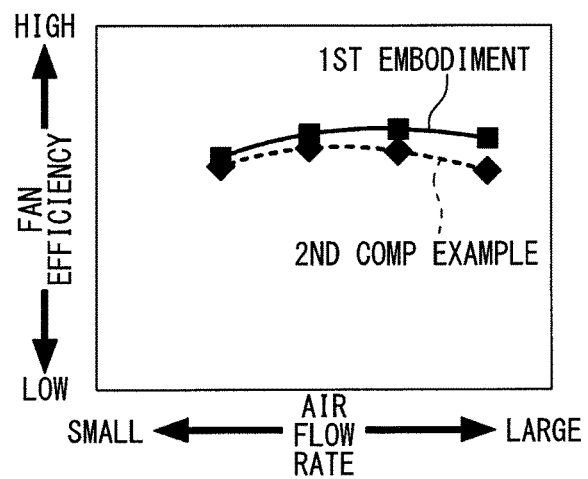
FIG. 8 is a diagram showing comparison between the first embodiment and the second comparative example of FIG. 7 with respect to a fan efficiency of the blower device.

Next, an advantage of limiting the worsening of the noise of the blower device 30 will be specifically described with reference to FIGS. 7 and 8. FIG. 7 is a cross sectional view of a first blower unit 101 of a second comparative example that is contrasted with the present embodiment, corresponding of FIG. 5 of the present embodiment. Furthermore, FIG. 8 is a diagram showing comparison between the present embodiment and the second comparative example of FIG. 7 with respect to a fan efficiency of the blower device 30. A duct 48 of FIG. 7 is a conduit that guides the air, which is outputted from the cushion air passage 121c, to the air intake opening 30a of the blower device 30 like the air passage forming member 42 of the present embodiment shown in FIG. 5. Furthermore, arrows indicated in an inside of the duct 48 and an inside of the blower device 30 in FIG. 7 indicate the air flow. Furthermore, a blower device 30, which is included in the second comparative example of FIG. 7, is the same as the blower device 30 of the present embodiment, and the second comparative example is an example, in which the air passage forming member 42 of the first embodiment is replaced with the duct 48.

As indicated in the second comparative example of FIG. 7, when the duct 48 is simply connected to the air intake opening 30a of the blower device 30, from which the bell mouth 46 of FIG. 6 is eliminated, contraction is generated in an air flow, which is indicated by the dotted arrows, in the air intake opening 30a of the blower device 30. Therefore, a variation in a wind speed in a wind speed profile at a blade leading edge portion 381a, which is an upstream end of the blades 381 in the air flow, is increased, and thereby a fan efficiency of the blower device 30 is deteriorated. Specifically, the air flow is contracted to cause an increase in the variation in the wind speed in a region Q1 of the blade leading edge portion 381a, which is adjacent to the air intake opening 30a.

The present embodiment provides the following advantages over the second comparative example discussed above. Specifically, as indicated by the arrows FL1, FL2 in FIG. 5, the contraction of the air flow at the air intake opening 30a can be limited because of the positional relationship between the downstream end 421a of the connecting air passage 421 of the air passage forming member 42 and the air intake opening 30a of the blower device 30 shown in FIG. 5, and the narrowing configuration of the connecting air passage 421. Thereby, the air, which flows into the air intake opening 30a of the blower device 30, can be smoothly guided toward the outer side in the radial direction DRr.

That is, the air can be effectively flown into each corresponding gap defined between the corresponding adjacent two of the blades 381 of the blower device 30. Therefore, in the present embodiment, it is possible to limit the deterioration of the performance of the blower device 30 and the worsening of the noise of the blower device 30, which would be otherwise caused by the deterioration of the fan efficiency of the blower device 30. For example, as shown in FIG. 8, the fan efficiency of the blower device 30 of the present embodiment, which is indicated by a solid line, is higher than the efficiency of the blower device 30 of the second comparative example, which is indicated by a dotted line.

Referring back to FIG. 5, according to the present embodiment, in the view taken in the fan axial direction DRa, the connecting air passage 421 of the air passage forming member 42 is arranged such that the peripheral edge 421b of the downstream end 421a of the connecting air passage 421 and the peripheral edge 30c of the air intake opening 30a of the blower device 30 are aligned with each other. Here, for the descriptive purpose, it is now assumed that the peripheral edge 421b of the downstream end 421a of the connecting air passage 421 is located on the outer side of the peripheral edge 30c of the air intake opening 30a of the blower device 30 in the radial direction DRr of the fan central axis CL. In the case where the above assumption is applied, the air flow, which is outputted from the connecting air passage 421 along the air passage inner wall surface 425, collides against a portion of the first case member 321, which forms the peripheral edge 30c of the air intake opening 30a, so that the air flow is directed toward the inner side in the radial direction DRr. For example, the air flow is directed toward the inner side in the radial direction DRr like the air flow indicated by the arrow FLm in FIG. 6 or the arrow FLn in FIG. 7.

That is, in the present embodiment, it is possible to avoid the directing of the air flow, which is outputted from the connecting air passage 421 along the air passage inner wall surface 425, toward the inner side in the radial direction DRr. Specifically, it is possible to avoid the directing of the air flow, which flows along the air passage inner wall surface 425, toward the inner side in the radial direction DRr of the fan central axis CL caused by the placement of the connecting air passage 421 relative to the air intake opening 30a of the blower device 30 at the downstream end 421a of the connecting air passage 421. Also, it is possible to limit generation of the turbulence of the air flow at the downstream end 421a of the connecting air passage 421.

Therefore, the air flow (i.e., the air flow FL1 of FIG. 5), which is directed toward the outer side in the radial direction DRr of the fan central axis CL in comparison to the fan axial direction DRa, can be formed in the air that flows along the air passage inner wall surface 425 at the downstream end 421a of the connecting air passage 421 through the guidance by the narrowed portion 425b that is included in the air passage inner wall surface 425. At the blower device 30, the air flow, which is flown into each corresponding gap defined between the corresponding adjacent two of the blades 381 of the centrifugal fan 38, can be formed as the air flow, which is directed toward the outer side in the radial direction DRr of the fan central axis CL in comparison to the fan axial direction DRa.

Furthermore, according to the present embodiment, the air passage inner wall surface 425 of the air passage forming member 42 has the narrowed portion 425b, at which the connecting air passage 421 is narrowed. That is, due to the provision of the narrowed portion 425b, the air passage inner wall surface 425 has the sloped surface 425c, which progressively increases the passage cross sectional area of the connecting air passage 421 toward the downstream end 421a of the connecting air passage 421, on the downstream side of the apex of the narrowed portion 425b along the air flow. Thus, the air flow, which is directed obliquely relative to the fan axial direction DRa toward the outer side in the radial direction DRr of the fan central axis CL, can be formed at the downstream end 421a of the connecting air passage 421.

Second Embodiment

Next, a second embodiment will be described. In the present embodiment, differences, which are different from the first embodiment, will be mainly described, and the description of the portions, which are the same as or are equivalent to those of the first embodiment, will be omitted or simplified. This is also equally applied to the third and subsequent embodiments.

Figure 9:
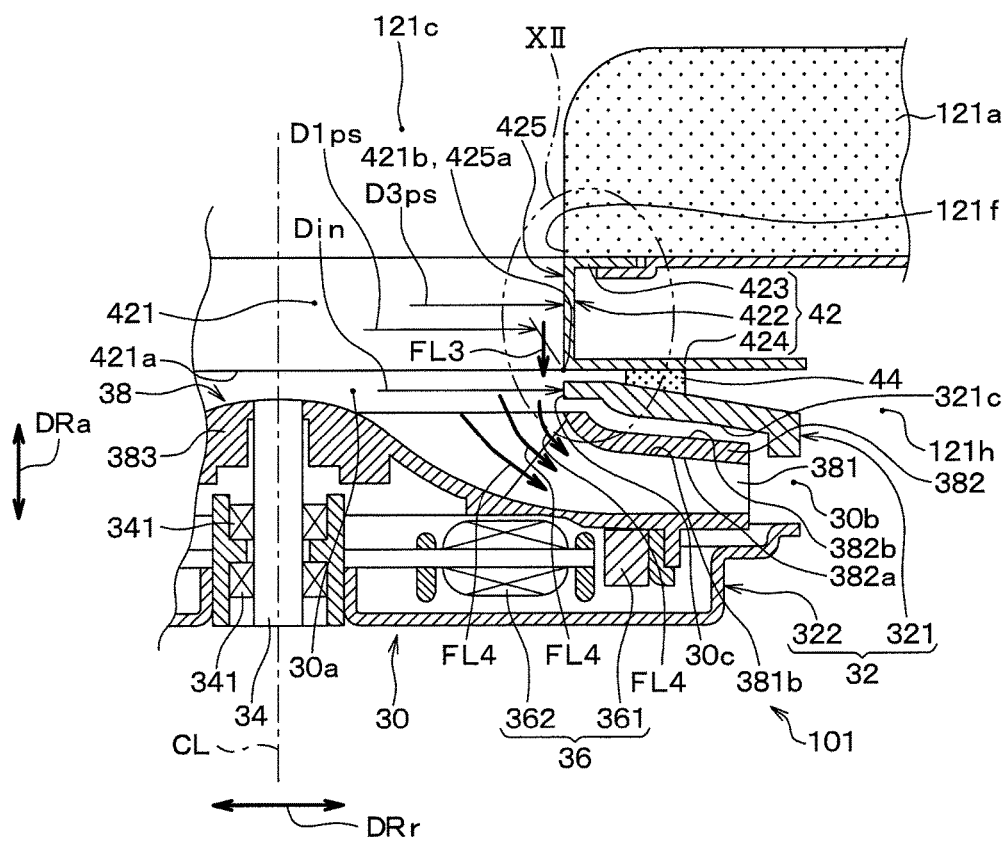
FIG. 9 is a cross sectional view taken along line V-V (see FIG. 2), schematically showing a structure of a first blower unit according to a second embodiment, and corresponding to FIG. 5 of the first embodiment.

FIG. 9 is a cross sectional view taken along line V-V (see FIG. 2), schematically showing a structure of a first blower unit 101 according to the present embodiment, and corresponding to FIG. 5 of the first embodiment. As shown in FIG. 9, in the present embodiment, the configuration of the duct portion 422 of the air passage forming member 42 is different from that of the first embodiment.

Specifically, the duct portion 422 of the air passage forming member 42 is in a form of a straight tube that extends in the fan axial direction DRa. Therefore, the connecting air passage 421, which is formed in the inside of the duct portion 422, extends in the fan axial direction DRa and has a constant passage cross sectional area along an entire extent of the connecting air passage 421. That is, a passage diameter $D3ps$ of the connecting air passage 421 is equally sized along the entire extent of the connecting air passage 421, so that the passage diameter $D3ps$ is the same as the passage downstream end opening diameter $D1ps$.

The passage downstream end opening diameter $D1ps$ of the connecting air passage 421 is the same as the air intake opening diameter Din of the blower device 30 like in the first embodiment. Even in the present embodiment, for example, it is desirable that the relationship between the passage downstream end opening diameter $D1ps$ and the air intake opening diameter Din is $(D1ps-Din)/Din \leq \pm 0.05$.

The air passage forming member 42 of the present embodiment is formed in the above described manner. Therefore, the air, which flows in the connecting air passage 421 of the air passage forming member 42, flows from the connecting air passage 421 to the centrifugal fan 38 through the air intake opening 30a of the blower device 30, as indicated by arrows FL3, FL4. The arrows FL3, FL4 of FIG. 9 indicate an air flow FL3, FL4, which flows from the connecting air passage 421 to the centrifugal fan 38 through the air intake opening 30a of the blower device 30. Particularly, the arrow FL3 indicates the air flow FL3, which flows along the air passage inner wall surface 425.

That is, the air passage forming member 42 is arranged such that among the air that flows in the connecting air passage 421, the air, which flows along the air passage inner wall surface 425, forms the air flow (i.e., the air flow FL3), which is directed in the fan axial direction DRa, at the downstream end 421a of the connecting air passage 421.

The advantages, which are achieved by the structure that is common to the first embodiment, can be similarly achieved in the present embodiment.

Furthermore, in the present embodiment, the connecting air passage 421 of the air passage forming member 42 has the constant passage cross sectional area and extends in the fan axial direction DRa. Therefore, in comparison to the first embodiment, in which the middle of the connecting air passage 421 is narrowed, a change in the passage cross sectional area is small along the entire extent of the connecting air passage 421 relative to the air intake opening 30a of the blower device 30. Therefore, a pressure loss of the air flow, which flows into the air intake opening 30a of the blower device 30, can be limited.

At the downstream end 421a of the connecting air passage 421, the air flow, which flows along the air passage inner wall surface 425, is directed obliquely relative to the fan central axis CL toward the outer side in the radial direction DRr, as indicated by the arrow FL1 in FIG. 5 in the first embodiment. In contrast, according to the present embodiment, at the downstream end 421a of the connecting air passage 421, the air flow, which flows along the air passage inner wall surface 425, is directed in the fan axial direction DRa, as indicated by the arrow FL3 in FIG. 9. Therefore, in the present embodiment, the advantage of limiting the turbulence of the air flow, which is flown into each corresponding gap defined between the corresponding adjacent two of the blades 381 of the centrifugal fan 38, cannot be expected to be as large as that of the first embodiment but can be larger than that of the second comparative example of FIG. 7.

Third Embodiment

Next, a third embodiment will be described. In the present embodiment, differences, which are differed from the first embodiment, will be mainly described.

Figure 10:
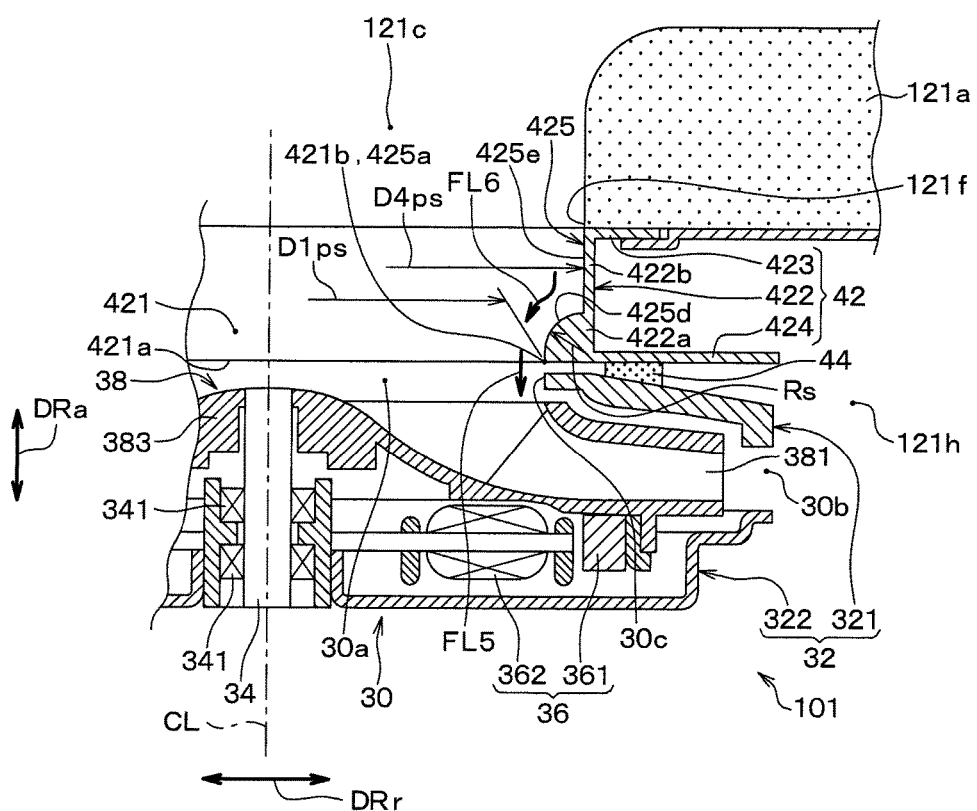
FIG. 10 is a cross sectional view taken along line V-V (see FIG. 2), schematically showing a structure of a first blower unit according to a third embodiment, and corresponding to FIG. 5 of the first embodiment.

FIG. 10 is a cross sectional view taken along line V-V (see FIG. 2), schematically showing a structure of a first blower unit 101 according to the present embodiment, and corresponding to FIG. 5 of the first embodiment. As shown in FIG. 10, in the present embodiment, the configuration of the duct portion 422 of the air passage forming member 42 is different from that of the first embodiment.

Specifically, the duct portion 422 of the air passage forming member 42 includes a duct downstream end portion 422a and a duct tubular portion 422b. The duct downstream end portion 422a is placed at the downstream side in the connecting air passage 421 along the air flow. The duct tubular portion 422b is in a form of a cylindrical straight pipe and extends from the duct downstream end portion 422a toward the upstream side along the air flow. The duct downstream end portion 422a is bulged toward the radially inner side of the duct portion 422 relative to the duct tubular portion 422b, and the duct downstream end portion 422a is shaped into a circular ring form that is centered at the fan central axis CL. That is, the duct downstream end portion 422a is shaped into the form that corresponds to the bell mouth.

Specifically, the air passage inner wall surface 425, which is an inner peripheral wall surface of the duct portion 422, includes an inner wall surface downstream end portion 425d, which is an inner peripheral wall surface of the duct downstream end portion 422a, and a large diameter wall surface portion 425e, which is an inner peripheral wall surface of the duct tubular portion 422b. The inner wall surface downstream end portion 425d is formed at the downstream side in the air passage inner wall surface 425 along the air flow. The large diameter wall surface portion 425e extends from the inner wall surface downstream end portion 425d toward the upstream side along the air flow and has an inner diameter D4ps, which is larger than that of the air intake opening 30a of the blower device 30. A passage cross sectional area of the large diameter wall surface portion 425e is constant along the entire extent of the large diameter wall surface portion 425e. The inner wall surface downstream end portion 425d is formed at the downstream side in the air passage inner wall surface 425, so that a downstream end edge of the inner wall surface downstream end portion 425d is a downstream end edge 425a of the air passage inner wall surface 425.

Specifically, the inner wall surface downstream end portion 425d, which is included in the air passage inner wall surface 425, is shaped into the ring form about the fan central axis CL. In the radial cross section, which includes the fan central axis CL, the cross section of the inner wall surface downstream end portion 425d is shaped into an arcuate form (e.g. a form of a quarter arc) that is bulged toward the connecting air passage 421, as shown in FIG. 10. A radius Rs of the cross section of the inner wall surface downstream end portion 425d, which is shaped into the arcuate form, is, for example, 2.5 mm or larger. Furthermore, in the above radial cross section, a tangent line, which is tangent to the inner wall surface downstream end portion 425d at the downstream end edge 425a of the air passage inner wall surface 425 is directed in the fan axial direction DRa.

A relationship between the passage downstream end opening diameter D1ps of the connecting air passage 421 and the air intake opening diameter Din of the blower device 30 in the present embodiment is the same as that of the first embodiment. Specifically, the passage downstream end opening diameter D1ps of the connecting air passage 421 is equal to the air intake opening diameter Din of the blower device 30. The air intake opening diameter Din is shown in FIG. 4.

The air passage forming member 42 of the present embodiment is formed in the above described manner, so that the air, which flows along the air passage inner wall surface 425 of the air passage forming member 42, flows from the connecting air passage 421 to the air intake opening 30a of the blower device 30, as indicated by arrows FL5, FL6. The arrows FL5, FL6 of FIG. 10 indicate an air flow FL5, Fl6, which flows from the connecting air passage 421 to the air intake opening 30a of the blower device 30 along the air passage inner wall surface 425. Particularly, the arrow FL5 indicates the air flow FL5 at the downstream end 421a of the connecting air passage 421.

In the present embodiment, as discussed above, in the radial cross section of FIG. 10, the tangent line, which is tangent to the inner wall surface downstream end portion 425d at the downstream end edge 425a of the air passage inner wall surface 425, is directed in the fan axial direction DRa. Therefore, the air flow FL5 at the downstream end 421a of the connecting air passage 421 is directed in the fan axial direction DRa. That is, the air passage forming member 42 is arranged such that among the air that flows in the connecting air passage 421, the air, which flows along the air passage inner wall surface 425, forms the air flow (i.e., the air flow FL5), which is directed in the fan axial direction DRa, at the downstream end 421a of the connecting air passage 421.

The advantages, which are achieved by the structure that is common to the first embodiment, can be similarly achieved in the present embodiment.

Fourth Embodiment

Next, a fourth embodiment will be described. In the present embodiment, differences, which are differed from the first embodiment, will be mainly described.

Figure 11:
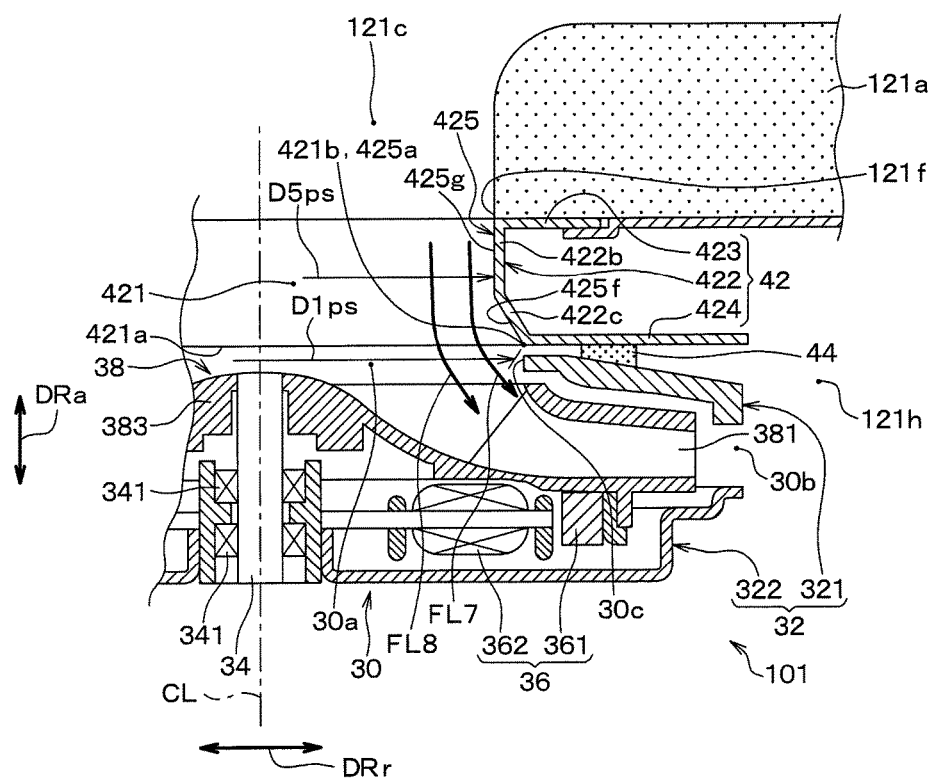
FIG. 11 is a cross sectional view taken along line V-V (see FIG. 2), schematically showing a structure of a first blower unit according to a fourth embodiment, and corresponding to FIG. 5 of the first embodiment.

FIG. 11 is a cross sectional view taken along line V-V (see FIG. 2), schematically showing a structure of a first blower unit 101 according to the present embodiment, and corresponding to FIG. 5 of the first embodiment. As shown in FIG. 11, in the present embodiment, the shape of the duct portion 422 of the air passage forming member 42 is different from that of the first embodiment.

Specifically, the duct portion 422 of the air passage forming member 42 includes a duct enlarging diameter portion 422c and a duct tubular portion 422b. An inner diameter of the duct enlarging diameter portion 422c is progressively increased toward the downstream side in the connecting air passage 421 along the air flow. The duct tubular portion 422b is in a form of a cylindrical straight pipe and extends from the duct enlarging diameter portion 422c toward the upstream side along the air flow.

The air passage inner wall surface 425, which is the inner peripheral wall surface of the duct portion 422, includes a sloped surface 425f and a tubular wall surface portion 425g. The sloped surface 425f is an inner peripheral wall surface of the duct enlarging diameter portion 422c. The tubular wall surface portion 425g is an inner peripheral wall surface of the duct tubular portion 422b. The sloped surface 425f is formed at the downstream side in the air passage inner wall surface 425. The sloped surface 425f forms the connecting air passage 421 such that the sloped surface 425f is tapered and progressively increases the passage cross sectional area of the connecting air passage 421 toward the downstream end 421a of the connecting air passage 421.

The tubular wall surface portion 425g, which is included in the air passage inner wall surface 425, extends from the sloped surface 425f toward the upstream side along the air flow and has an inner diameter DSps that is smaller than that of the air intake opening 30a of the blower device 30. A passage cross sectional area of the tubular wall surface portion 425g is constant along the entire extent of the tubular wall surface portion 425g. The sloped surface 425f is formed at the downstream side in the air passage inner wall surface 425, so that the downstream end edge of the sloped surface 425f is the downstream end edge 425a of the air passage inner wall surface 425.

A relationship between the passage downstream end opening diameter D1ps of the connecting air passage 421 and the air intake opening diameter Din of the blower device 30 in the present embodiment is the same as that of the first embodiment. Specifically, the passage downstream end opening diameter Dlps of the connecting air passage 421 is equal to the air intake opening diameter Din of the blower device 30. The air intake opening diameter Din is shown in FIG. 4.

The air passage forming member 42 of the present embodiment is formed in the above described manner. Therefore, the air, which flows in the connecting air passage 421 of the air passage forming member 42, flows from the connecting air passage 421 to the centrifugal fan 38 through the air intake opening 30a of the blower device 30, as indicated by arrows FL7, FL8. The arrows FL7, FL8 of FIG. 11 indicate an air flow FL7, FL8, which flows from the connecting air passage 421 to the centrifugal fan 38 through the air intake opening 30a of the blower device 30. Particularly, the arrow FL7 indicates the air flow FL7, which flows along the air passage inner wall surface 425.

That is, the air passage forming member 42 is arranged such that among the air that flows in the connecting air passage 421, the air, which flows along the air passage inner wall surface 425, forms the air flow (i.e., the air flow FL7), which is directed obliquely relative to the fan axial direction DRa toward the outer side in the radial direction DRr at the downstream end 421a of the connecting air passage 421.

The advantages, which are achieved by the structure that is common to the first embodiment, can be similarly achieved in the present embodiment.

Fifth Embodiment

Next, a fifth embodiment will be described. In the present embodiment, differences, which are differed from the second embodiment, will be mainly described.

Figure 12:
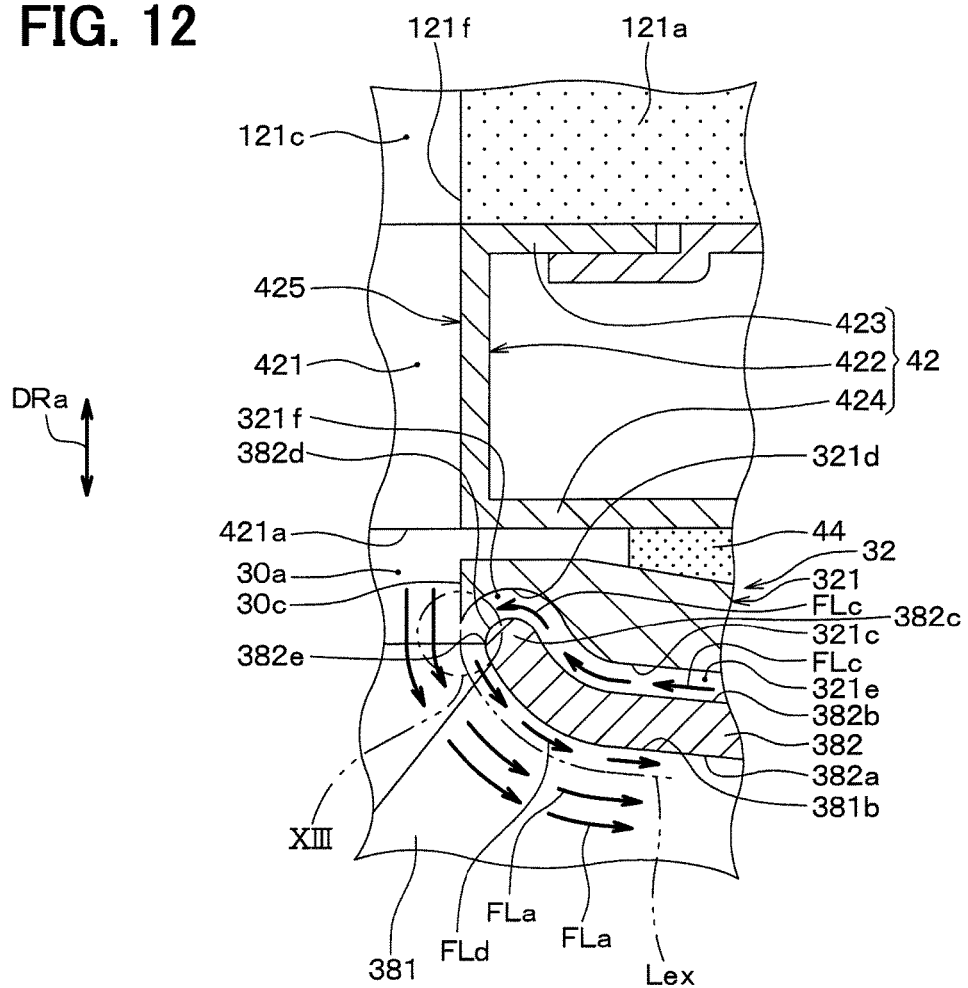
FIG. 12 is an enlarged partial cross sectional view of a first blower unit according to a fifth embodiment, showing a portion that corresponds to a portion XII in FIG. 9.

FIG. 12 is an enlarged partial cross sectional view of a first blower unit 101 according to the present embodiment, showing a portion that corresponds to a portion XII in FIG. 9. As shown in FIG. 12, in the present embodiment, the shapes of the side plate 382 of the centrifugal fan 38 and of a portion around the air intake opening 30a of the blower device case 32 are different from the second embodiment.

In the centrifugal fan 38 of the blower device 30, each of the blades 381 includes one end 381b at the air intake opening 30a side in the fan axial direction DRa, and each of the blades 381 is joined to the side plate 382 through the one end 381b of the blade 381.

The side plate 382 includes a first side surface 382a, which is opposed to the main plate 383, and a second side surface 382b, which is a side surface that is opposite from the first side surface 382a. That is, the first side surface 382a is located on a blade connecting side of the side plate 382, at which the blades 381 are joined to the side plate 382, and the second side surface 382b is located on an opposite side of the side plate 382, which is opposite from the blade connecting side.

Furthermore, the side plate 382 includes an inner end edge portion 382c that is located at a radially inner side in the side plate 382 in the radial direction. A surface of the inner end edge portion 382c includes a round surface 382d. The round surface 382d of the inner end edge portion 382c is a curved surface that extends continuously and is rounded from the first side surface 382a to the second side surface 382b. For example, in the cross section (e.g., the cross section shown in FIG. 12), which includes the fan central axis CL, the round surface 382d is shaped into an arcuate form, which extends continuously from the first side surface 382a to the second side surface 382b.

The first case member 321 of the blower device case 32 includes an opposing wall surface 321c, which is opposed to the second side surface 382b of the side plate 382, and an opposing round surface 321d, which is opposed to the round surface 382d of the side plate 382.

Specifically, the opposing wall surface 321c of the blower device case 32 is opposed to the second side surface 382b of the side plate 382 such that a gap 321e is interposed between the opposing wall surface 321c and the second side surface 382b. The opposing wall surface 321c is shaped to correspond to the second side surface 382b. For example, the opposing wall surface 321c is shaped into a form that is formed by offsetting the second side surface 382b.

Furthermore, the opposing round surface 321d of the blower device case 32 is a curved surface that extends continuously from the opposing wall surface 321c. The opposing round surface 321d of the blower device case 32 is opposed to the round surface 382d of the side plate 382 such that a gap 321f is interposed between the opposing round surface 321d and the round surface 382d. Additionally, the opposing round surface 321d is shaped to correspond to the round surface 382d. For example, the opposing round surface 321d is shaped into a form that is formed by offsetting the round surface 382d. The gap 321f between the round surface 382d and the opposing round surface 321d has the same width as that of the gap 321e between the second side surface 382b and the opposing wall surface 321c. The width of the gap 321f and the width of the gap 321e are constantly set.

Here, as discussed above, the air, which flows in the cushion air passage 121c of the vehicle seat 12, flows into the air intake opening 30a of the blower device 30 through the connecting air passage 421 of the air passage forming member 42 in response to the rotation of the centrifugal fan 38. At this time, a pressure difference is generated between the air intake opening 30a and the discharge outlet 30b shown in FIG. 9.

Because of this pressure difference, the air flows backward in the gaps 321e, 321f between the first case member 321 of the blower device case 32 and the side plate 382 of the centrifugal fan 38. Specifically, the air flows in the gaps 321e, 321f, as indicated by arrows FLb, FLc in FIGS. 12 and 13. The air, which flows in the direction of the arrows FLb, FLc, merges with the main flow air, which flows from the air intake opening 30a.

Figure 13:
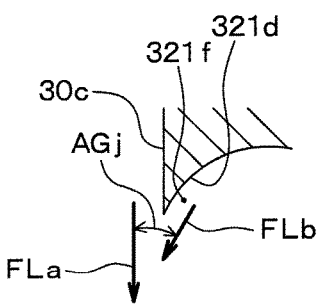
FIG. 13 is an enlarged view of a portion XIII in FIG. 12.

In order to limit the generation of the turbulence in the air flow at the time of this merging, according to the present embodiment, the opposing round surface 321d of the blower device case 32 extends to a location that is on the inner side of the radially inner end 382e of the side plate 382 in the radial direction DRr of the fan central axis CL. As shown in FIGS. 12 and 13, the opposing round surface 321d guides the merging air such that a merging angle AGj of the merging air becomes an acute angle. This merging air is the air that merges from the gap 321f, which is formed between the opposing round surface 321d and the round surface 382d, to the main flow air that flows from the air intake opening 30a into the corresponding gap defined between the corresponding adjacent blades 381, as indicated by the arrow FLa. Furthermore, the merging angle AGj of the merging air is an angle of a flow direction of the merging air relative to a flow direction of the main flow air at the time of merging the merging air to the main flow air. FIG. 13 is an enlarged view of a portion XIII in FIG. 12.

The advantages, which are achieved by the structure that is common to the second embodiment, can be similarly achieved in the present embodiment.

Furthermore, according to the present embodiment, at the blower device 30, the inner end edge portion 382c of the side plate 382 is formed by the round surface 382d, which is curved from the first side surface 382a to the second side surface 382b. Also, the opposing wall surface 321c of the blower device case 32 is opposed to the second side surface 382b such that the gap 321e is formed between the opposing wall surface 321c and the second side surface 382b, and the opposing wall surface 321c is shaped into the form that is in conformity with the form of the second side surface 382b. In addition, the opposing round surface 321d of the blower device case 32 extends continuously from the opposing wall surface 321c and is opposed to the round surface 382d of the side plate 382 such that the gap 321f is formed between the opposing round surface 321d and the round surface 382d, and the opposing round surface 321d is shaped into the form that is in conformity with the form of the round surface 382d.

Therefore, the merging air, which flows backward through the gaps 321e, 321f between the first case member 321 and the side plate 382 of the centrifugal fan 38, is smoothened, and the merging angle AGj shown in FIG. 13 is reduced. In this way, the merging air can be merged to the main flow air while the turbulence of the air flow is limited.

Furthermore, the main flow air is smoothened by the connecting air passage 421 of the air passage forming member 42 and is guided to the air intake opening 30a. Therefore, a turbulent flow energy, which is generated upon the merging of the main flow air with the merging air, can be reduced.

Furthermore, according to the present embodiment, the opposing round surface 321d of the blower device case 32 extends to the location that is on the inner side of the radially inner end 382e of the side plate 382 in the radial direction DRr of the fan central axis CL. Thereby, for example, in the cross sectional view of FIG. 12, an extension line Lex of the peripheral edge 30c of the air intake opening 30a becomes a curve line that is offset from the first side surface 382a of the side plate 382 by an amount that corresponds to a space occupied by the merging air described above. Thus, the merging air (e.g., the merging air that flows as indicated by the arrow FLd), which is outputted from the gap 321f between the round surface 382d and the opposing round surface 321d, and the main flow air (e.g., the main flow air that flows as indicated by the arrow FLa), which is outputted from the air intake opening 30a, can be flown in parallel with each other. Furthermore, the turbulent flow energy, which is generated by the merging air and the main flow air, can be reduced.

The opposing round surface 321d of the blower device case 32 shown in FIGS. 12 and 13 guides the merging air such that the merging angle AGj of the merging air, which flows from the gap 321f between the opposing round surface 321d and the round surface 382d in the direction of the arrow FLb toward the main flow air outputted from the air intake opening 30a, becomes the acute angle. Therefore, for example, in comparison to a case where the merging angle AGj becomes an obtuse angle, the turbulence of the air flow, which is caused by the merging of the merging air to the main flow air, can be further limited.

Figure 14:
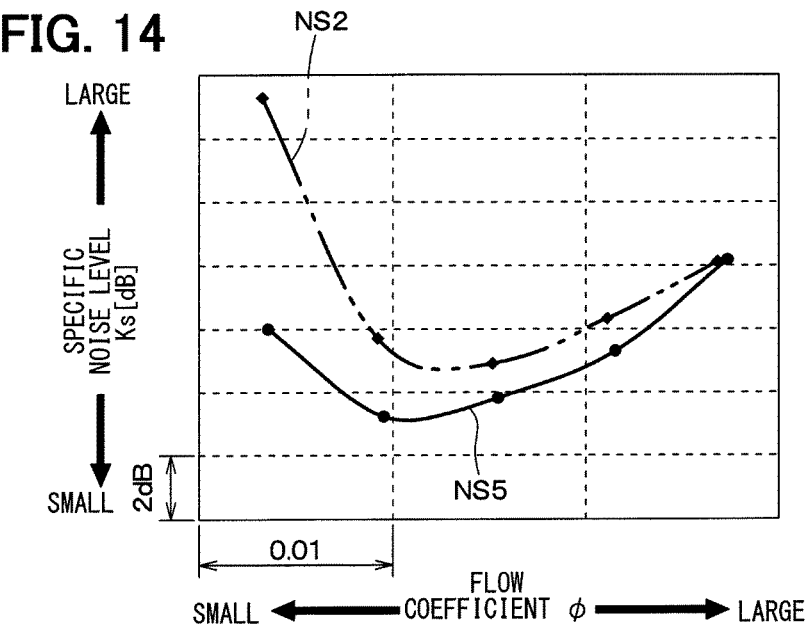
FIG. 14 is a graph showing a relationship between a flow coefficient and a specific noise level of the blower device for contrasting between the fifth embodiment and the second embodiment, while the above relationship of the second embodiment is indicated by a curve line NS2, and the above relationship of the fifth embodiment is indicated by a curve line NS5.

Because of the above effect, according to the present embodiment, the turbulent flow energy can be reduced, and turbulent flow noise, which is generated through the fan rotation, can be reduced, as indicated in FIG. 14. FIG. 14 is a graph showing a relationship between a flow coefficient $\phi$ and a specific noise level Ks of the blower device 30 for contrasting between the present embodiment and the second embodiment. In FIG. 14, a curve line NS2 indicates the above relationship of the second embodiment, and a curve line NS5 indicates the above relationship of the present embodiment.

Furthermore, according to the present embodiment, the width of the gap 321f, which is formed between the round surface 382d and the opposing round surface 321d, is the same as the width of the gap 321e, which is formed between the second side surface 382b and the opposing wall surface 321c. Therefore, for example, in comparison to a structure where the gap 321f of the former one is enlarged in comparison to the gap 321e of the later one, the flow rate of the merging air, which flows backward through the gaps 321e, 321f, i.e., a leak flow rate of the blower device 30 can be reduced to improve the efficiency of the blower device 30.

Although the present embodiment is the modification of the second embodiment, the present embodiment may be combined with the first embodiment, the third embodiment or the fourth embodiment discussed above.

Other Embodiments (1) In each of the above embodiments, the air passage forming member 42 is made of the elastic material, such as the rubber. However, the material of the air passage forming member 42 is not necessarily limited to the elastic material. For example, the air passage forming member 42 may be made of plastic that has the rigidity, which is higher than that of, for example, the rubber.

Furthermore, the air passage forming member 42 may be made of the same material (e.g., the urethane foam) as that of the packing material 44, which implements the sealing performance upon compression thereof. In such a case, the packing material 44 is not required, and the connecting air passage 421 can be connected to the air intake opening 30a of the blower device 30.

(2) In each of the above embodiments, the duct portion 422, in which the connecting air passage 421 is formed, is shaped into the tubular form. However, the outer shape of the duct portion 422 should not be limited to any particular one as long as the connecting air passage 421 is formed in the inside of the duct portion 422.

(3) In each of the above embodiments, the passage cross section of the connecting air passage 421 is in the form of circle that is centered at the fan central axis CL. However, the shape of the passage cross section of the connecting air passage 421 should not be limited to this shape. For example, the passage cross section of the connecting air passage 421 may be in a form of rectangle or in a form of ellipse. This is also true for the shape of the downstream end 421a of the connecting air passage 421, and the downstream end 421a of the connecting air passage 421 may be in a form of rectangle or in a form of ellipse. That is, it is not necessary that the downstream end 421a is shaped into the same form as that of the air intake opening 30a of the blower device 30, which is in the form of circle.

(4) In the first embodiment, as shown in FIGS. 4 and 5, the passage downstream end opening diameter D1ps of the connecting air passage 421 coincides with the air intake opening diameter Din of the blower device 30. However, the present disclosure should not be limited to this configuration, and the passage downstream end opening diameter Dips of the connecting air passage 421 may be equal to or less than the air intake opening diameter Din of the blower device 30. In other words, the connecting air passage 421 of the air passage forming member 42 may be set such that the connecting air passage 421 is entirely placed within a range that is occupied by the air intake opening 30a in the view taken in the fan axial direction DRa. This is also true for the second to fourth embodiments.

Figure 15:
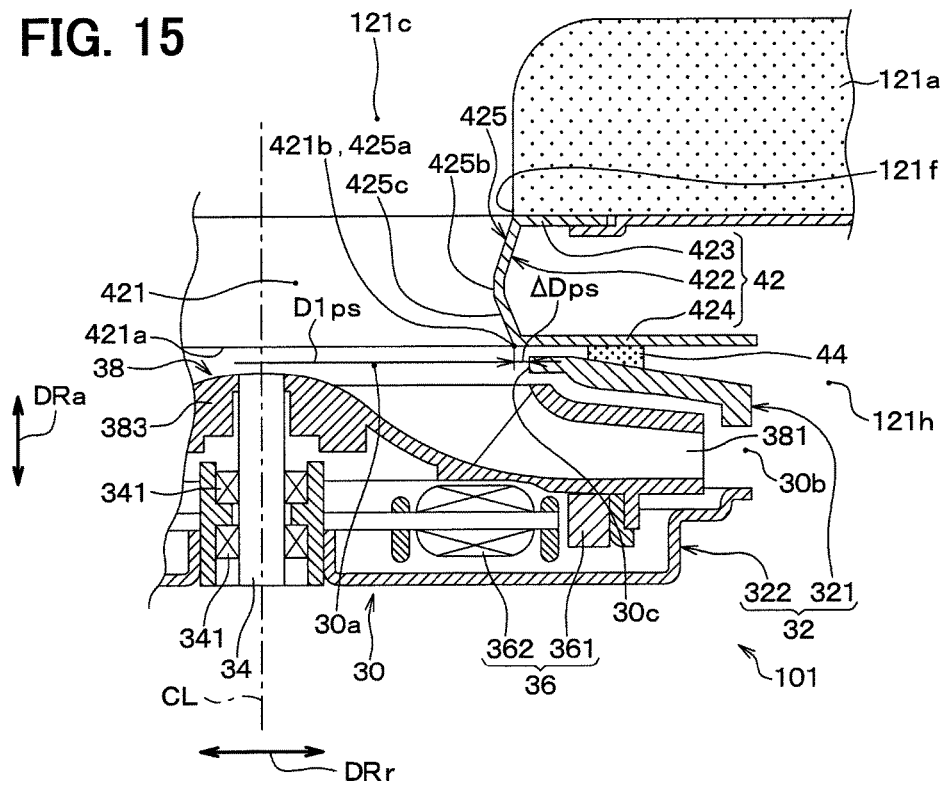
FIG. 15 is a cross sectional view taken along line V-V (see FIG. 2), schematically showing a structure of a first blower unit according to another embodiment, which is a modification of the first embodiment, and corresponding to FIG. 5 of the first embodiment.

For example, FIG. 15 shows a modification of the first embodiment, in which the passage downstream end opening diameter D1ps is equal to or less than the air intake opening diameter Din. In the modification shown in FIG. 15, the passage downstream end opening diameter D1ps is smaller than the air intake opening diameter Din by an amount that corresponds to a difference ΔDps between the passage downstream end opening diameter D1ps and the air intake opening diameter Din. In the case of this configuration, as discussed above, the connecting air passage 421 is arranged such that the downstream end 421a of the connecting air passage 421 is entirely placed within the range that is occupied by the air intake opening 30a in the view taken in the fan axial direction DRa. Thus, in the modification of FIG. 15, the air, which is outputted from the downstream end 421a of the connecting air passage 421, can be easily directed toward the outer side in the radial direction DRr of the fan central axis CL. FIG. 15 is a cross sectional view taken along line V-V (see FIG. 2), schematically showing the structure of the first blower unit 101 according to the modification of the first embodiment, and corresponding to FIG. 5 of the first embodiment. Here, in the case of the view taken in the fan axial direction DRa, the range, which is occupied by the air intake opening 30a, specifically refers to a range of a circle, which is centered at the fan central axis CL and has a diameter that is the same as the air intake opening diameter Din.

(5) In each of the above embodiments, the vehicle seat air conditioning device 10 includes the two blower units 101, 102. Alternatively, the vehicle seat air conditioning device 10 may include only one blower unit or three or more blower units. Furthermore, the vehicle seat air conditioning device 10 is a device that creates an air flow at the seat backrest 121 and the seat bottom 122 of the vehicle seat 12.

Alternatively, the vehicle seat air conditioning device 10 may be a device that creates an air flow at another portion of the vehicle seat 12, which is other than the seat backrest 121 and the seat bottom 122, in addition to or alternative to the seat backrest 121 and the seat bottom 122.

(6) In the fifth embodiment, the second side surface 382b of the side plate 382 of the centrifugal fan 38 is formed by a planar smooth surface. However, the second side surface 382b of the side plate 382 of the centrifugal fan 38 may include a protrusion(s) and a recess(es). This is also true for the first to fourth embodiments.

The present disclosure should not be limited to the above embodiments. The present disclosure is intended to cover various modifications and equivalent arrangements within the spirit and scope of the present disclosure. Furthermore, the respective embodiments are not unrelated to each other and can be appropriately combined together in an appropriate combination unless the combination is clearly impossible. Furthermore, in each of the above embodiments, constituent elements of the embodiments are not always essential unless the constituent elements are clearly specified to be particularly essential, or unless the constituent elements are obviously considered essential in view of the principle of the present disclosure. Furthermore, in each of the above embodiments, in the case where the number of the component(s), the value, the amount, the range, or the like is specified, the present disclosure is not limited to the number of the component(s), the value, the amount, or the like specified in the embodiment unless the number of the component(s), the value, the amount, or the like is indicated as indispensable or is obviously indispensable in view of the principle of the present disclosure. Furthermore, in each of the above embodiments, in the case where the material of the component(s), the shape of the component(s), and/or the positional relationship of the component(s) are specified, the present disclosure is not limited to the material of the component(s), the shape of the component(s), and/or the positional relationship of the component(s) unless the embodiment specifically states that the material of the component(s), the shape of the component(s), and/or the positional relationship of the component(s) is necessary, or the embodiment states that the present disclosure is limited in principle to the material of the component(s), the shape of the component(s), and/or the positional relationship of the component(s) discussed above.

What is claimed is:

1. A blower unit comprising:
an air passage forming member, in which a connecting air passage is formed, wherein the connecting air passage is connected to a cushion air passage that is formed in a cushion member of a vehicle seat, and the air passage forming member has an air passage inner wall surface that forms a wall surface of the connecting air passage; and
a blower device that includes:
a blower device case, in which an air intake opening is formed, wherein the air intake opening is connected to an opposite side of the connecting air passage, which is opposite from the cushion air passage; and
a centrifugal fan that is received in the blower device case and draws air, which is present in the cushion air passage, through the connecting air passage and the air intake opening in this order when the centrifugal fan is rotated about a fan central axis, wherein:

the air passage forming member is arranged such that at a downstream end of the connecting air passage along the air flow, the air, which flows along the air passage inner wall surface in the connecting air passage, forms an air flow, which is directed in an axial direction of the fan central axis, or an air flow, which is directed toward an outer side in a radial direction of the fan central axis in comparison to the air flow that is directed in the axial direction;
the air passage inner wall surface includes:
an inner wall surface downstream end portion, which is formed at a downstream side in the air passage inner wall surface along the air flow; and
a large diameter wall surface portion, which extends from the inner wall surface downstream end portion toward an upstream side along the air flow and has an inner diameter that is larger than an inner diameter of the air intake opening; and
the inner wall surface downstream end portion is shaped into a ring form about the fan central axis, and a cross section of the inner wall surface downstream end portion is shaped into an arcuate form that is bulged toward the connecting air passage in a cross section of the inner wall surface downstream end portion that includes the fan central axis.

2. The blower unit according to claim 1, wherein the connecting air passage is arranged such that when the connecting air passage is viewed in the axial direction, the downstream end of the connecting air passage is entirely placed within a range that is occupied by the air intake opening.

3. The blower unit according to claim 1, wherein the connecting air passage is formed such that when the connecting air passage is viewed in the axial direction, a peripheral edge of the downstream end of the connecting air passage and a peripheral edge of the air intake opening are aligned with each other.

4. A blower unit comprising:
an air passage forming member, in which a connecting air passage is formed, wherein the connecting air passage is connected to a cushion air passage that is formed in a cushion member of a vehicle seat, and the air passage forming member has an air passage inner wall surface that forms a wall surface of the connecting air passage; and
a blower device that includes:
a blower device case, in which an air intake opening is formed, wherein the air intake opening is connected to an opposite side of the connecting air passage, which is opposite from the cushion air passage; and
a centrifugal fan that is received in the blower device case and draws air, which is present in the cushion air passage, through the connecting air passage and the air intake opening in this order when the centrifugal fan is rotated about a fan central axis, wherein:
the air passage forming member is arranged such that at a downstream end of the connecting air passage along the air flow, the air, which flows along the air passage inner wall surface in the connecting air passage, forms an air flow, which is directed in an axial direction of the fan central axis, or an air flow, which is directed toward an outer side in a radial direction of the fan central axis in comparison to the air flow that is directed in the axial direction;
the centrifugal fan includes:
a plurality of blades, each of which has one end on a side where the air intake opening is located in the axial direction, wherein the plurality of blades is arranged one after another about the fan central axis; and
a side plate, which is shaped into a ring form, wherein each of the plurality of blades is joined to the side plate at the one end of the blade;
the side plate includes:
a first side surface that is located on a blade connecting side of the side plate, at which the plurality of blades is joined to the side plate;
a second side surface that is located on an opposite side of the side plate, which is opposite from the blade connecting side; and
an inner end edge portion that is located at a radially inner side in the side plate in the radial direction, wherein the inner end edge portion has a round surface, which extends continuously and is rounded from the first side surface to the second side surface; and
the blower device case includes:
an opposing wall surface that is opposed to the second side surface such that a gap is interposed between the opposing wall surface and the second side surface, wherein the opposing wall surface is shaped to correspond to the second side surface; and
an opposing round surface that extends continuously from the opposing wall surface and is opposed to the round surface such that a gap is interposed between the opposing round surface and the round surface, wherein the opposing round surface is shaped to correspond to the round surface.

5. The blower unit according to claim 4, wherein the air passage inner wall surface has a narrowed portion that narrows a middle portion of the connecting air passage.

6. The blower unit according to claim 4, wherein the air passage inner wall surface has a sloped surface, which is formed at a downstream side in the air passage inner wall surface along the air flow and progressively increases a passage cross sectional area of the connecting air passage toward the downstream end of the connecting air passage.

7. The blower unit according to claim 4, wherein:
the air passage inner wall surface includes:
an inner wall surface downstream end portion, which is formed at a downstream side in the air passage inner wall surface along the air flow; and
a large diameter wall surface portion, which extends from the inner wall surface downstream end portion toward an upstream side along the air flow and has an inner diameter that is larger than an inner diameter of the air intake opening; and
the inner wall surface downstream end portion is shaped into a ring form about the fan central axis, and a cross section of the inner wall surface downstream end portion is shaped into an arcuate form that is bulged toward the connecting air passage in a cross section of the inner wall surface downstream end portion that includes the fan central axis.

8. The blower unit according to claim 4, wherein the connecting air passage has a constant passage cross sectional area and extends in the axial direction.

9. The blower unit according to claim 4, wherein:
the opposing round surface extends to a location that is on an inner side of a radially inner end of the side plate in the radial direction of the fan central axis; and
the opposing round surface guides a merging air, which merges from the gap formed between the opposing round surface and the round surface to a main flow air that flows from the air intake opening into a corresponding gap defined between corresponding adjacent two of the plurality of blades, such that a merging angle of the merging air relative to the main flow air is an acute angle.

10. The blower unit according to claim 4, wherein the connecting air passage is arranged such that when the connecting air passage is viewed in the axial direction, the downstream end of the connecting air passage is entirely placed within a range that is occupied by the air intake opening.

11. The blower unit according to claim 4, wherein the connecting air passage is formed such that when the connecting air passage is viewed in the axial direction, a peripheral edge of the downstream end of the connecting air passage and a peripheral edge of the air intake opening are aligned with each other.

* * * * *